(No Model.)

J. J. GREEN.
ELECTRIC CURRENT METER.

No. 337,679. Patented Mar. 9, 1886.

Witnesses
A. A. Moon,
A. A. Connolly

Inventor
John J. Green
by Connolly Bros.
Attorneys

UNITED STATES PATENT OFFICE.

JOHN J. GREEN, OF BOONTON, NEW JERSEY.

ELECTRIC-CURRENT METER.

SPECIFICATION forming part of Letters Patent No. 337,679, dated March 9, 1886.

Application filed September 10, 1885. Serial No. 176,671. (No model.)

*To all whom it may concern:*

Be it known that I, JOHN J. GREEN, a citizen of the United States, residing at Boonton, in the county of Morris and State of New Jersey, have invented certain new and useful Improvements in Electric Current Meters; and I do hereby declare the following to be a full, clear, and exact description of the invention, such as will enable others skilled in the art to which it appertains to make and use the same.

This invention has relation to electric current-measuring instruments of that class wherein the amount of current passing through a conductor in a given length of time is determined by or calculated from the change in height of a body of liquid contained in a glass vessel and in circuit with the said conductor or a branch or shunt therefrom through a pair of suitable electrodes.

This invention has for its object the provision of means whereby an instrument of the class referred to may be readily and easily adjusted, and thereby adapted to indicate upon a suitable scale the passage of currents of different character; and my invention consists, first, in the provision of a novel form of scale for indicating the diminution of the liquid contents of the glass vessel; secondly, in the provision of means for adjusting the distance apart of the electrodes; thirdly, in the novel construction, combination, and arrangement of parts, as hereinafter described and specifically claimed.

Figure 1:
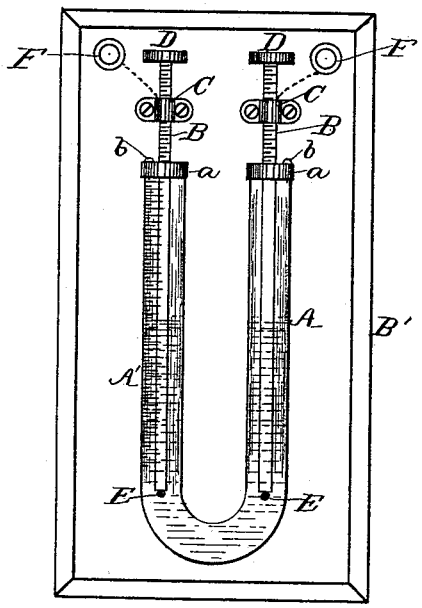
Figure 2:
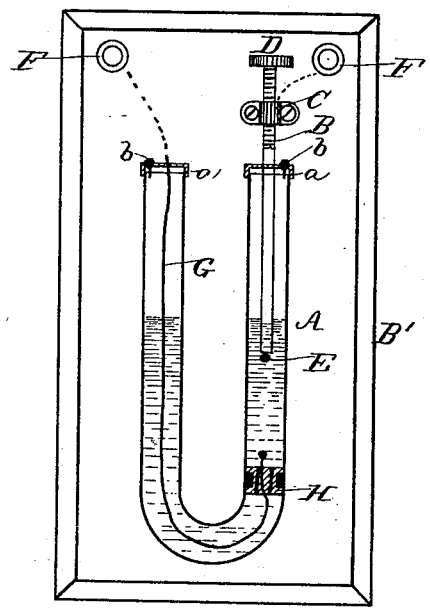
Figure 3:
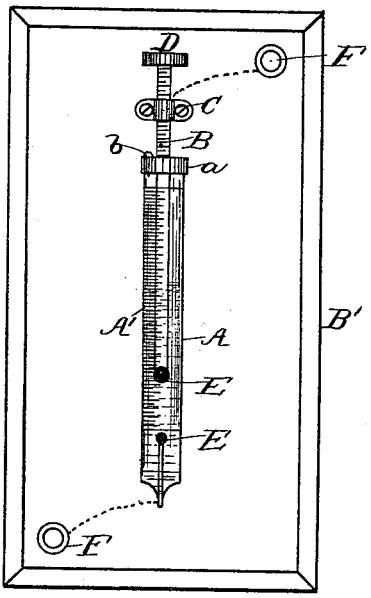

Referring to the accompanying drawings, wherein I have illustrated my invention in several modified forms, all, however, being within the spirit of my invention, Figure 1 is a front elevation of a form of my invention, showing two electrodes dipping into a U-shaped tube of glass, both said electrodes being vertically adjustable and the indicating-scale being formed directly upon the surface of the tube; Fig. 2, a similar view of a modified form, but one of the electrodes being adjustable, the other projecting through a perforated plug fixed in one of the legs of the tube; Fig. 3, a still further modification showing a straight tube fixed in position and having a stationary electrode at its lower and a movable electrode at its upper end; and Fig. 4, a still further modification, the tube in this case carrying an electrode sealed into its bottom, but the said tube, as well as the upper electrode, being adjustable in a vertical direction.

Similar letters of reference designate similar parts in all the figures.

A designates the tube, which is adapted to contain the liquid through the decomposition of which the electric current is measured, and A' designates a scale cut upon or attached to the exterior surface of said tube. In Figs. 1 and 2 of the drawings this tube A is of a U shape, and has attached to it two end caps, a a, each of which is provided with a central opening for the passage of the rod carrying the electrode, and also with a small valve, b, for the escape of the gases generated or resulting from the decomposition of the liquid in the tube. In Fig. 1 it will be observed that there are two similar electrodes carrying rods B B, each of which is screw-threaded and passes through a nut, C, on the baseboard of the instrument. These electrode-rods B B are each provided at top with a thumb-piece, D, and at the bottom with a small platinum electrode, E. Two binding-posts, F F, are placed at the upper corners of the base-board B' of the instrument, and said binding-posts are connected, respectively, with the two nuts C C.

In the instrument shown in Fig. 2 a similar tube to that shown in Fig. 1 is employed, and the arrangement of the electrode-carrying rod dipping into one leg of the tube is the same as that shown in Fig. 1. The other leg of the tube, however, is unprovided with the adjustable electrode, and in place thereof a wire, G, passes down through that leg of the tube and around the bend at the bottom into the other leg, where it passes through a fixed perforated plug, H.

Figure 4:
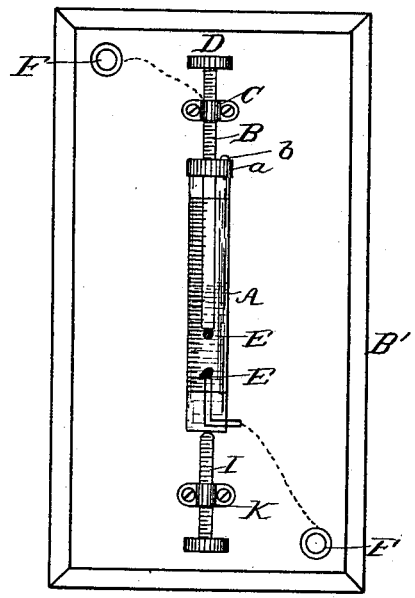

In the forms shown in Figs. 3 and 4 the U-shaped tube is replaced by a straight tube having an electrode sealed into its lower end and a movable electrode, similar to that shown in Figs. 1 and 2, at its upper end.

In Fig. 3 the tube A is secured to the baseboard B', as in Figs. 1 and 2; but in Fig. 4 the tube is attached to the end of a screw, I, which works through a nut, K, and thereby serves as a medium through which the tube may be adjusted toward the electrodes passing through the cap on its top. The upper electrode in this form of the instrument is also adjusted as in the other figures, the lower electrode passing through the bottom of the tube and being sealed therein, as shown.

From the above description it will be observed that while the construction and arrangement of parts are slightly different in each figure, the principle and mode of operation are the same in each case—i. e., the distance between the electrodes' points is made adjustable through the medium of a screw-rod and a nut, and the scale through which the difference in level of the liquid is noted is formed directly upon or attached to the tube instead of being placed upon the base-board, as has heretofore been the custom.

Various substances may be employed as a liquid for the tubes—as water or other fluid easily decomposed—or a metallic or mineral substance possessing the required properties may be used.

The operation of my invention is as follows: The tube being filled or partly filled with the desired liquid, and the height of the liquid as indicated on the scale having been noted, the instrument is made part of the electric circuit or a derivation thereof, the terminals of the circuit being connected to the binding-posts F F. Now, when the current passes through the liquid in the tube, the liquid will be decomposed, the resultant gases will pass off through the valve $b$ in the caps $a$, and the liquid contents being diminished such diminution will be apparent upon inspecting the scale upon the tube. The distance apart of the electrodes may be easily and readily adjusted to suit currents of different character.

Having described my invention, I claim—

1. In an electric-current-measuring instrument, the combination, with a vessel adapted to receive a liquid, a scale to indicate changes in the height of such liquid, and two electrodes entering said tube, of means, substantially as described, for adjusting the distance between said electrodes, as set forth.

2. In an electric-current-measuring instrument, the combination, with the tube A, secured to a base and provided with an outlet for the gases of decomposition, of the nut C, also secured to the base of the instrument, the screw-threaded rod B, passing through said nut, and the electrode attached to the end of said rod, all constructed and arranged substantially as described.

3. In an electric current-measuring instrument, the combination, with a straight glass tube, A, having an electrode passing up into its interior from beneath and containing a liquid, of an adjustable electrode passing into the said tube from above and dipping into said fluid, substantially as described.

In testimony whereof I have affixed my signature in presence of two witnesses.

JOHN J. GREEN.

Witnesses:
CHARLES S. NORRIS,
ALLEN LOOKER.